Oct. 22, 1957     A. U. BRYANT     2,810,543
VALVE CONSTRUCTION
Filed Dec. 14, 1954     4 Sheets-Sheet 1
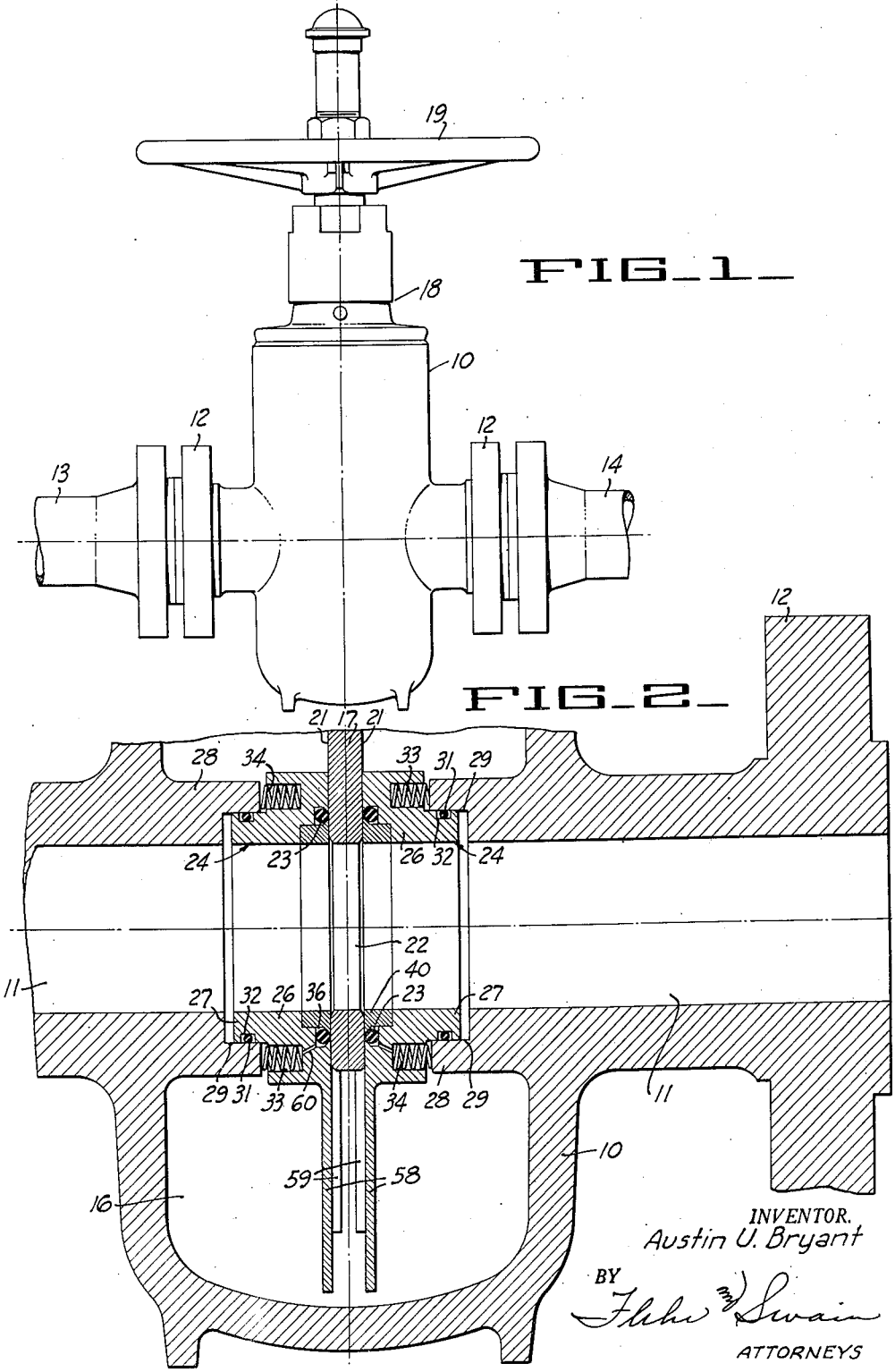
INVENTOR.
Austin U. Bryant
BY
ATTORNEYS

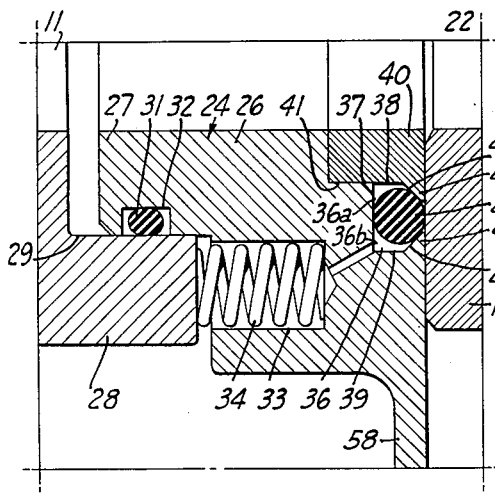
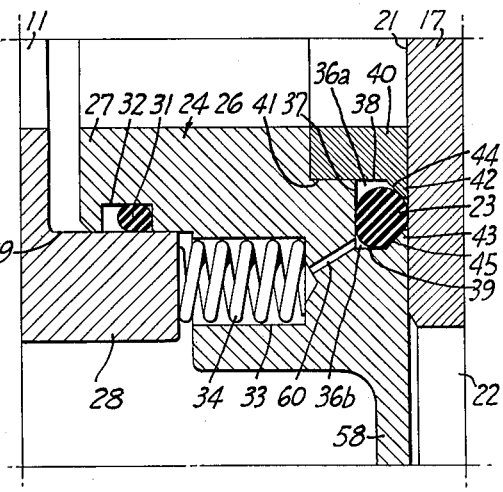
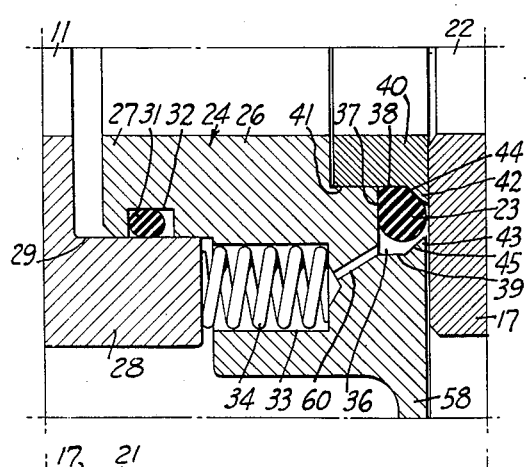
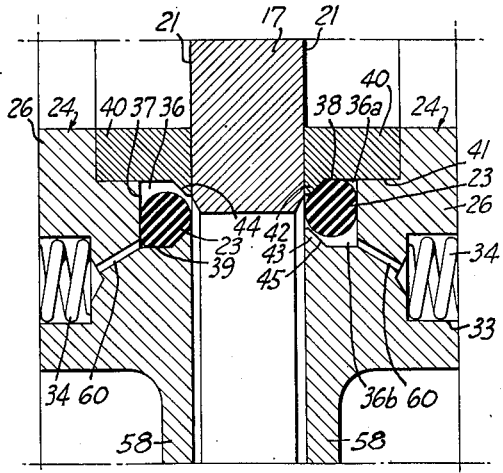
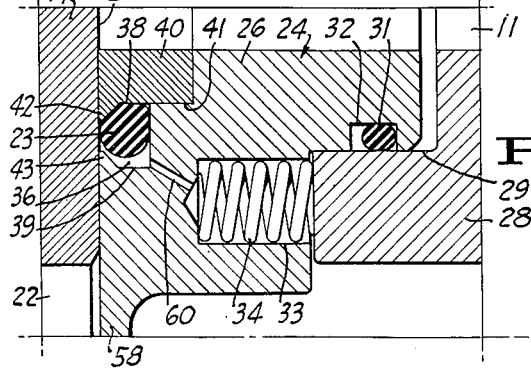

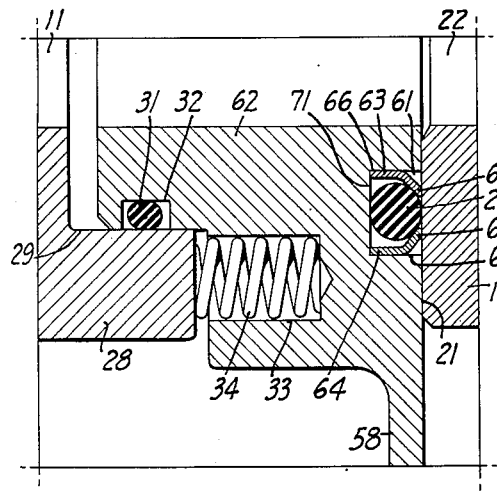
FIG_4A_
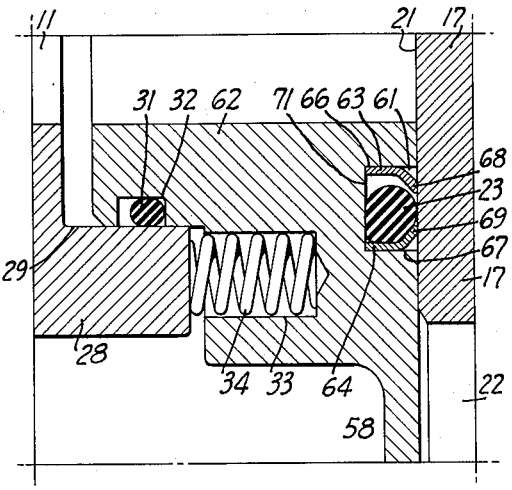
FIG_4B_
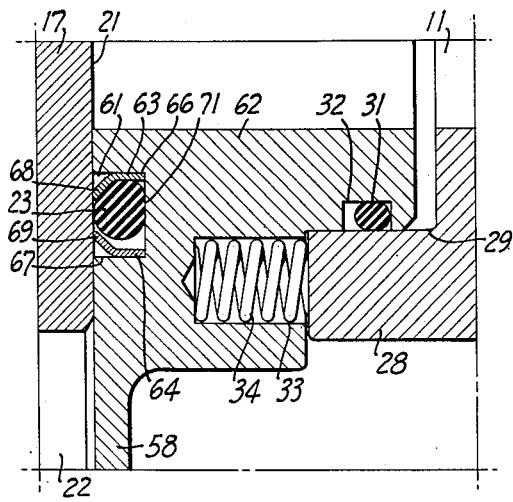
FIG_4C_
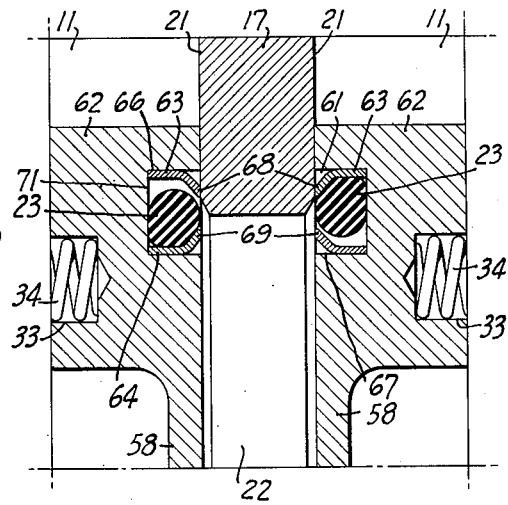
FIG_4D_
INVENTOR.
Austin U. Bryant
BY
ATTORNEYS

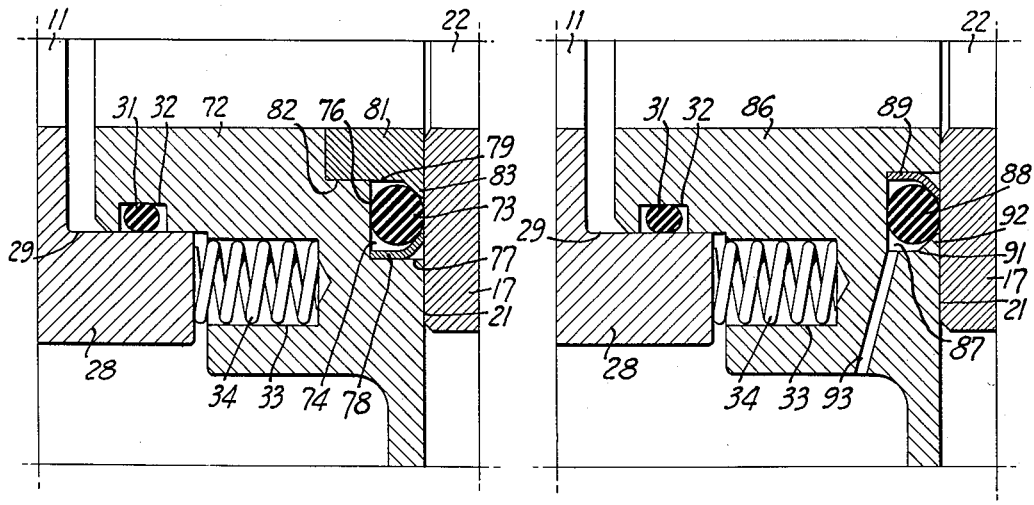
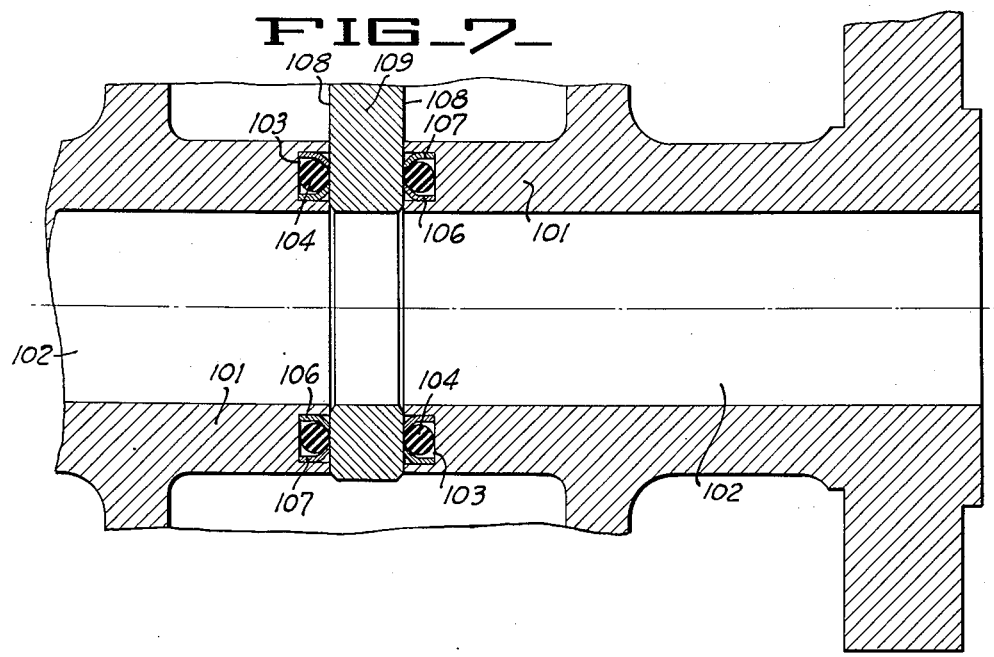

United States Patent Office 2,810,543
Patented Oct. 22, 1957

2,810,543

VALVE CONSTRUCTION

Austin U. Bryant, Walnut Creek, Calif., assignor, by mesne assignments, to Walworth Company, New York, N. Y., a corporation of Massachusetts Application December 14, 1954, Serial No. 475,106

6 Claims. (Cl. 251—172)

This invention relates generally to valves of the gate type used for controlling flow of various fluids, including gases and liquids.

Conventional valves of the gate type are widely used because of their desirable flow characteristics. When in open position a straight through passage is provided with offers no appreciable resistance to fluid flow. A disadvantage of such valves is that it is difficult to maintain them in such operating condition that they provide an effective seal when closed. The prevailing practice is to provide mechanical means for jamming or forcing the valve working surfaces into direct sealing contact. It is difficult, if not impossible, to maintain a bubble tight seal between metal to metal surfaces, even when urged together with considerable force. The use of a lubricant film on the valve working surfaces aids in maintaining a tight seal, but it is difficult to effectively maintain such lubrication. Thus, it is common for a good seal established by the use of a lubricant film to be lost by washing away or dissolution of the lubricant by line fluid. A further disadvantage of conventional gate valves is the fact that a considerable force must be applied to move the valve member between open and closed positions. This is largely due to the mechanical forces applied to urge the valve working surfaces into engagement. Lubrication may reduce the effort required to move the valve gate but after being in a flow line for a considerable period of time without being operated, the valve member frequently tends to stick to the body, thus requiring excessive operating forces.

Some gate valves have been constructed with resilient rubber seat rings which are compressed when the gate is in closed position. The constructions used for such valves have been such that they cannot be used on relatively high line pressures. Thus, particularly for the higher operating pressures, such valves are subject to breaking or rapid wear of the seat rings, excessive friction between the rings and the adjacent moving parts, or dislodgment of the resilient seat rings because of the differential fluid pressures and high fluid flow velocities encountered for different operating conditions.

In the past certain valves have been provided with one or more resilient seal rings of the O-ring type to provide a fluid tight seal when the valve member is in closed position. Such a valve is disclosed in Bryant application Serial No. 3,728, filed January 22, 1948, Patent 2,713,989, granted July 26, 1955, entitled "Valve Construction." Special problems are involved when it is attempted to apply sealing means of the O-ring type to gate valves. It is desirable with such valves to seal against pressure applied to either side, and this complicates the problem of mounting the O-rings in such a manner that they are not dislodged or injured during the various operating conditions, while at the same time providing a tight shutoff.

In general it is an object of the present invention to provide a novel valve construction of the gate type which has novel means of accomplishing and maintaining a fluid tight shutoff.

Another object of the invention is to provide a valve of the above character making use of sealing means of the resilient O-ring type, and which is capable of two-way service, or in other words, which may be opened and closed with fluid pressure applied to either side of the same.

Another object of the invention is to provide a gate valve of the above character having novel means for mounting the resilient seal rings, and which provides a valve usable over a wide range of operating pressures.

Another object of the invention is to provide a valve of the above character which can be used with resilient O-rings of various hardnesses, depending upon various operating requirements.

Another object of the invention is to provide a gate valve construction which facilitates manufacture, assembly and servicing operations.

Additional objects and features of the invention will appear from the following description in which the preferred embodiments have been set forth in detail in conjunction with the accompanying drawings.

Referring to the drawings:

Figure 1 is a side elevation illustrating one embodiment of a gate valve incorporating the present invention.

Figure 2 is an enlarged detail in section illustrating particularly the mounting means for the O-rings, and the relationship of the O-rings to the valve gate.

Figure 3A, 3B, and 3C are enlarged cross-sectional details illustrating one of the O-rings and its associated mounting means for different operating conditions.

Figure 3D is an enlarged cross-section of detail illustrating two O-rings for an operating condition in which the gate is being moved to open position, with line pressure applied to one side of the valve.

Figure 3E is an enlarged cross sectional detail like 3A, but showing the parts in a particular position to illustrate the self-relieving action.

Figures 4A–4D are cross sectional details illustrating a second embodiment of the invention.

Figure 5 is a cross-sectional detail illustrating a third embodiment of the invention.

Figure 6 is a cross-sectional detail illustrating a fourth embodiment of the invention.

Figure 7 is a cross-sectional detail illustrating a fifth embodiment of the invention.

The valve illustrated in Figures 1 and 2 of the drawing consists of a body 10 provided with flow passages 11. Flanges 12 or other suitable means can be provided for coupling the body to the associated piping 13 and 14. Within the body there is a closed space 16 which serves to accommodate the valve gate 17. One end of the gate is attached to an operating rod or stem, (not shown) which extends through the removable bonnet 18. This bonnet assembly can be made in accordance with that disclosed and claimed in my copending application Serial No. 349,849, filed April 20, 1953. Valve operating means is associated with the exterior end of the stem and may include the handwheel 19. Suitable operating means for this purpose is disclosed in said application Ser. No. 349,849.

The gate 17 is of the plate type having flat parallel side surfaces (i. e., valve working surfaces) 21. The port 22 formed in this plate is adapted to register with the passages 11 for open position of the valve.

The side surfaces 21 of the gate are adapted to be engaged by the resilient seal rings 23 of the O-ring type, and these rings in turn are retained by the annular mounting means or assemblies 24. The arrangement is such that normally the seal rings together with the mounting assemblies establish a fluid tight seal between the body and the gate.

As illustrated particularly in Figure 2, each of the mounting assemblies 24 consists of a metal ring 26 having an annular portion 27 of reduced exterior diameter. The adjacent annular portion 28 of the valve body is provided with a cylindrical bore 29 in which the portion 27 is slidably fitted. Leakage between these parts is prevented by suitable means such as the resilient ring 31 of the O-ring type and which is accommodated in the annular groove 32.

Spring means is provided to urge the mounting rings toward the gate. Thus each ring is shown provided with a plurality of circumferentially spaced openings 33, which accommodate the compression springs 34. Normally these springs serve to press the seal rings 23 into sealing contact with the gate surfaces 21.

Each of the O-rings 23 is accommodated in an annular recess 36 formed in the corresponding mounting ring 26. Each recess is defined by a bottom surface 37 extending substantially parallel to the corresponding gate surface 21, and which is adapted to have sealing contact with one side of the O-ring.

Each of the recesses 36 in this instance is defined by the cylindrical concentric surfaces 38 and 39 which extend parallel to each other and at right angles to the bottom surface 37. Surface 38 is defined by the outer periphery of an inner metal seat ring 40 which is loosely fitted within the bore 41. Spaced concentric retaining lips 42 and 43 are formed respectively on the inner seat ring 40 and the mounting ring 26. The inner faces 44 and 45 of these lips can be generally conical shaped, and in section they can extend at an angle of about 45° to the adjacent face 21 of the valve gate.

The proportions are such that when an O-ring is first assembled within the recess 36 together with the inner seat ring 40, and without reference to the valve gate, a portion of the side face of the O-ring projects slightly beyond the lips 42 and 43. Contact of the lip 42 with the O-ring causes the seat ring 40 to be spaced slightly from the adjacent angular shoulder of the mounting ring 26. However, when some force is applied to the seat ring 40, lip 42 slightly deforms and compresses the O-ring to permit the seat ring to directly abut against the mounting ring 26. A small clearance exists between the outer periphery of the O-ring 23 and the surface 39, when the O-ring is relaxed. The smallest diameter of lip 43 is substantially less than the outside diameter of the O-ring 23. The angular spacing between the lips 42 and 43 is substantially less (e. g. about ⅝) the diameter of the O-ring in section.

The inner seat ring 40 is preferably dimensioned whereby its end face which is intended to contact the valve gate, extends a slight distance (i. e., a few thousandths of an inch) beyond the corresponding end face of the mounting ring 26.

In the complete assembly, and assuming that pressures are applied, the force applied by the springs 34 tends to squeeze the O-rings 23 between the gate surfaces 21 and the recess bottom surfaces 37. This more or less reduces the lateral dimensioning of the O-rings in the direction of applied compression, the amount depending upon the hardness of the material of which the rings are made. Such initial O-ring compression applied by the springs 34 is sufficient to establish fluid pressure sealing contact between each O-ring and the adjacent surfaces 21 and 37.

For a reason to be presently explained it is desirable to maintain a predetermined relationship between the mean diameter of the contact area of each O-ring and the adjacent gate surface 21, and the diameter of the bore 29. As shown in Figure 2, the relationship is such that the bore 29 has a diameter larger than the mean diameter of the O-ring contact area.

Suitable guard plates 58 can be carried by the mounting means 24 in the manner shown in Figure 2. The edges of these plates are shown provided with the ribs 59 for guiding the gate in its movements between open and closed positions.

Operation of my valve can best be explained by assuming several different operating conditions. Assuming first that no fluid pressure is applied to either pipe 13 or 14 and that no pressure exists in the body space 16, the various parts are in the positions illustrated in Figure 2, and each relaxed O-ring and its associated mounting means is as illustrated in Figure 3A. As previously explained each of the O-rings is slightly compressed between the adjacent parallel surfaces 21 and 37.

Assuming now that fluid pressure is applied to the pipe 13 and that the valve gate is in closed position, such pressure is applied to the inner periphery of the O-ring 23 on the upstream side of the gate, and such pressure differential expands the O-ring radially and presses it against the surface 39 (Figure 3B). In addition to the action of pressure upon the upstream O-ring, fluid pressure applies considerable force against the gate to thereby urge the gate against the O-ring mounting means on the down stream side. Also assuming that the bore 29 has a diameter somewhat greater than the mean diameter of the sealing area between the upstream O-ring and the valve working surface 21, line pressure can serve to urge the O-ring mounting means on the upstream side of the gate toward the downstream side or against the gate. Under such conditions, body pressure may be at atmospheric, or may have an intermediate pressure within the same by virtue of communication between the passages and the body space through the gate port during previous operations. Assuming that this body pressure applies pressure differential to the O-ring on the downstream side of the gate, then the downstream O-ring will be pressed against the inner seat ring 40 in the manner illustrated in Figure 3C.

Assuming that the gate is being moved from full closed toward open position, with line pressure applied to the pipe 13, then the upper edge of the port 22 passes through a critical condition where it leaves sealing contact with both of the O-rings in the manner illustrated in Figure 3D. Under such conditions some attenuated fluid flow occurs past both the O-rings and between the faces of the mounting ring 26 and valve working surfaces 21. Both O-rings under such conditions have fluid differential pressure being applied to the same. Differential on the upstream side tends to urge the O-ring against the surface 39, and differential on the downstream side serves to urge the O-ring against the inner seat ring 40.

In the above described construction, the corner 36a of recess 36, adjacent surface 37 is in pressure equalizing communication with the corresponding valve body passage. This communication is by virtue of the loose fit between the mounting ring 26 and the inner seat ring 40. In addition, the recess corner 36b is in pressure equalizing communication with the body space 16, through one or more ducts 60. Such pressure equalizing aids in preventing fluid pressure from bulging or dislodging an O-ring from its accommodating recess, during certain critical operating conditions, as when the valve gate is being moved from closed to open position and the gate port 22 commences to break its sealing relationship with respect to the O-rings. As illustrated in Figure 3D, under such critical conditions the O-ring on the upstream side of the gate has fluid pressure differential applied to the same which urges it toward recess corner 36b, because that corner of the recess is in pressure equalizing relationship with the lower pressure in the body. Likewise on the downstream side of the valve the O-ring is being urged towards the recess corner 36a. In addition to pressure equalization as described above the lips 42 and 43 aid in holding the O-rings within their accommodating recesses, thus preventing their dislodgement, or bulging under applied fluid pressures in such a manner as to cause mutilation or deterioration. Because of the dimensions previously mentioned the lips 42 and 43 form between them an annular gap which is substantially less than the diameter of the O-ring in section. Thus it is impossible for an O-ring to be dislodged from its recess without undergoing severe distortion. When an O-ring is expanded by pressure differential applied to its inner peripheral surface, it is urged against the inclined face 45, which thereby acts to produce a force component tending to urge the O-ring against the bottom surface 37. Likewise, when compressed as shown in Figure 3C, the face 44 of lip 42 acts in a similar manner to provide a force component tending to urge the O-ring toward the surface 37.

In addition to the functions described above, the inner seat rings 40 serve to provide supplemental metal to metal valve working surfaces. Thus, if leakage should occur past an O-ring, the associated inner seat ring 40 can be relied upon to provide an approximate secondary seal with respect to the gate, and thus minimize leakage until the valve can be repaired. In practice, this ring can be made of a suitable alloy capable of resisting corrosion for the intended valve service.

In the event trapped fluid pressure exists in the body space, when the valve member is closed and pressure in the valve passages reduced to a relatively low value or to atmospheric, differential fluid pressure is applied to the outer peripheries of both of the O-rings. Under such conditions, differential force is applied to both of the mounting rings 26, tending to urge them outwardly with respect to the valve gate. Thus, either one or both of the mounting means tends to retract from the gate, with the result that the upstream O-ring is retracted from sealing engagement with the gate thereby permitting such pressure to vent into the valve passages. This self-relieving action is illustrated more clearly in Figure 3E. In this case, it is assumed that the upstream left hand body passage may have some line pressure applied to the same, but that the pressure trapped in the body space is considerably higher. Note that the body pressure has compressed the upstream O-ring against the outer periphery of the corresponding inner seat ring 40, and that the resulting squeezing of the O-ring between the bottom surface 37 and the inclined surface 44 of the lip 42 has retracted the mounting ring 26 a slight amount from the gate, with the result that sealing contact has been broken between the upstream O-ring and the gate. This is made possible because the effective thrust of the O-ring against the surface 37 is sufficient to retract mounting ring 26 against the force of the springs and the force of any line pressure in the upstream valve passage. Also the seal rings 23 and 31 are effective in different diameters thereby presenting a fluid area to the body pressure tending to urge the assembly 24 away from the gate, and this aids in the self relieving action.

It will be evident from the foregoing that I have provided a gate valve having a number of desirable features.

In particular, the valve has the advantage of "bubble tight" seal obtained by the use of the resilient O-rings. The O-rings are not tightly clamped in place, but on the contrary are loosely retained within their accommodating recesses. The arrangement is such that differential fluid pressures applied to the O-rings do not cause them to be dislodged from the recesses or to be bulged in such a manner that they are exposed to excessive wear or injury when the valve gate is moved between closed and open positions. The valve is adapted for reversible operation, or in other words, it can be operated with pressure applied to either one of the two pipe connections. In addition to providing an arrangement whereby fluid pressure differentials applied to the O-rings tends to urge them within their accommodating recesses, the retaining lips likewise serve to engage and hold the O-rings to prevent their dislodgement. In general, the construction provides a valve which can be readily manufactured, assembled and serviced. Upon removal of the gate it is a simple matter to remove the mounting rings and their associated O-rings.

The O-rings have continuous contact with the side surfaces of the gate, whereby during operation they have a wiping-off action, which promotes good sealing contact for either open or closed positions. The force required to move the valve between open and closed positions is not excessive, due to the fact that the O-rings do not tend to grip the sides of the gate, even though the pressures applied may be relatively high. Furthermore, the force required for operation is not great because of the absence of jamming or clamping action. In the event the O-rings should become damaged to such an extent as to prevent them from sealing in a normal manner, metal to metal surfaces establish an approximate secondary seal, which can be relied upon until the valve is serviced.

In the embodiment described above, the seals are established upon both sides of the gate. If it should happen that one of the O-rings is injured in such a manner that it does not form a pressure resisting seal, then a pressure holding seal will be maintained by the other O-ring. Assuming that both of the O-rings are in normal condition and establish seals upon the sides of the gate, the body space is isolated from the line pressure, and may in fact be vented to the atmosphere, for either full open or closed positions, thus providing a means for detecting leakage, and permitting, if desired, the use of the valve in place of a line blind.

The O-rings may vary in hardness, depending upon formulation and the material from which they are constructed. For example, the O-rings can be made from a synthetic rubber like Hycar, with a suitable hardness which may range from about 60 to 100 on the durometer scale. The softer O-rings may be used for the lower operating pressures, whereas the harder rings are considered better for higher operating pressures, such as pressures ranging from 1,000 to 3,000 p. s. i. or higher. Rings harder than 100 may be used, particularly for relatively high operating pressures. In addition to synthetic rubbers of the Hycar type, I can utilize other synthetic elastomers, as for example, neoprene, Teflon, nylon and Kel F. Teflon and Kel F are desirable because of their ability to resist a wide variety of chemicals, and in addition they possess considerable hardness and are, therefore, suitable for use with relatively high operating pressures.

In the above described embodiment, the mounting means are movable relative to the body, and are urged by compression springs against the sides of the gate. This construction permits a certain amount of self aligning action of the mounting means with respect to the gate, thus simplifying accuracy and tolerance requirements.

In the embodiment of the invention illustrated in Figures 4A–D, the O-rings 23 are accommodated within the recesses 61, formed in the mounting ring 62. Metal insert rings 63 and 64 are interposed between each O-ring and the adjacent surfaces 66 and 67. The ring 63 can be formed of a metal strip or band provided with a bent edge portion 68, which in effect forms an O-ring retaining lip corresponding to the lip 42 of Figure 2. The outer end face of the insert ring 63 is machined flat to extend parallel and in proximity with the adjacent valve surface 21 of the gate. The ring 64 is formed in a similar manner and has its one edge bent to form the lip portion 69. The proportions are such that when an O-ring is assembled within the recess 61 together with the insert rings 63 and 64, and without reference to the gate, one edge of the ring 64 may bottom upon the surface 71 of the recess. The width of the ring 64 is such that when it is bottomed upon the surface 71, its outer end face is contiguous with the adjacent face of the mounting ring 62. The dimensions of insert ring 63 may be such that the engagement of this lip 68 with the O-ring and with the uncompressed O-ring in contact with surface 71, causes a slight clearance between the inner end of ring 63 and the surface 71, while at the same time causing the outer end surface of insert ring 63 to be in a position slightly in advance of the end face of the mounting ring 62. Likewise the dimensions of the O-ring are such that its one side tends to project slightly between the lips 68 and 69 and slightly beyond the outer end surface of the ring 63. Normally the O-ring is compressed between the O-ring and the gate and the outer edges of insert rings 63 and 64 are in contact with the gate.

In the complete assembly, and assuming that no line pressure is applied, the force supplied by springs 34 tends to squeeze the O-rings 23 between the gate surfaces 21 and the recess bottom surfaces 71. As in Figure 2, this serves to more or less reduce the lateral dimensioning of the O-rings in the direction of applied compression, the amount depending upon the hardness of the material from which the rings are made. Such initial compression of the O-rings is sufficient to establish tight sealing contact between each O-ring and the adjacent surfaces 21 and 71.

Operation of the embodiment illustrated in Figures 4A–4D is as follows: Assuming that no fluid pressure is applied to either pipe 13 or 14, and that no pressure exists in the body space 16, the various parts are in the positions illustrated in Figure 4A. Assuming now that fluid pressure is applied to the pipe 13 and that the valve gate is in closed position, such pressure is applied to the inner periphery of the O-ring on the upstream side of the gate, and this pressure expands the O-ring radially and presses it against the insert ring 64. In addition to the action of pressure upon the upstream O-ring, pressure applies force to press the gate against the downstream O-ring mounting means. Assuming that line pressure has been trapped in the body space and that the valve is closed, pressure differential is applied to the exterior periphery of the downstream O-ring, whereby this O-ring is pressed against the insert ring 63 in the manner illustrated in Figure 4C.

Assuming that the gate is being moved from full closed toward open position, with line pressure applied to the pipe 13, then the upper edge of the gate port 22 passes through a critical condition where it leaves sealing contact with both of the O-rings in the manner illustrated in Figure 4D. Under such conditions attenuated flow occurs past both of the O-rings whereby fluid pressure differential is applied to the same. Pressure differential on the upstream side urges the O-ring against the outer insert ring, and differential on the downstream side urges the O-ring against the inner insert ring.

In the embodiments of Figures 4A–4D, the insert rings 63 and 64, and their lips 68 and 69, make possible several functions. Because these insert rings are loosely fitted within the recesses 61, they establish pressure equalizing communication between the inner and outer bottom corners of each recess, and the corresponding valve passage and body space substantially in the same manner as previously described for the embodiment of Figure 2. Such pressure equalizing aids in preventing fluid pressure from bulging or dislodging the O-ring from its accommodating recess, substantially in the same manner as previously described for Figure 2. The lips 68 and 69 likewise aid in holding the O-rings within their accommodating recesses, in substantially the same manner as the lips 42 and 43 of the Figure 2.

In Figure 5, I have shown a modified mounting means in which only one insert ring is provided. Thus, in this instance the mounting ring 72 corresponds to the ring 26 of the Figure 2, and the O-ring 73 is accommodated in the recess 74. The recess is defined by the bottom surface 76 that is parallel to the valve working surface 21 of the gate, and by the exterior surface 77, that is engaged by the insert ring 78, corresponding to the insert of Figure 4A. The inner periphery of ring 73 engages a surface 79, which is formed on the outer periphery of the inner seat ring 81. This seat ring is loosely fitted within the cylindrical bore 82, formed upon the mounting ring 72. Likewise, seat ring 81 is provided with a lip 83.

The embodiment of Figure 5 operates substantially in the same manner as the first described embodiment. Pressure equalization of one corner of the recess 74 is accomplished by leakage between the seat ring 81 and the main mounting ring 72, and for the other corner by leakage between insert ring 78 and surface 77.

In the embodiment of Figure 6, the mounting ring 86 has a recess 87 for accommodating the O-ring 88, and the recess accommodates an insert ring 89 which corresponds to the ring 63 of Figure 4A. Surface 91, which in part defines recess 87, is formed directly upon the mounting ring 86, and this ring is likewise machined to provide the retaining lip 92, corresponding generally to the lip 43 of Figure 2. Pressure equalization is in this instance provided by the insert ring 89, and one or more small vents or ducts 93, which extend from one corner of the recess 87 and into communication with the body space.

In some instances it is possible to omit the mounting rings and mount the O-rings directly upon portions of the valve passage. Thus, as illustrated in Figure 7, the annular body portions 101, which surround the valve passages 102, have their inner ends provided with recesses 103 for accommodating the resilient O-rings 104. Each recess also serves to accommodate the insert rings 106 and 107, which can be constructed in a manner similar to the rings 63 and 64 of Figure 4A–4D. The size and give of the O-rings can be such that when assembled they are normally compressed, and this compression is sufficient to establish normal seating contact with the valve working surfaces 108 of the gate 109, on both the upstream and downstream sides. The embodiment of Figure 7, like that of Figure 2, establishes a seal upon both the upstream and downstream sides of the gate.

Reference is made to my copending applications Serial No. 271,037, filed February 11, 1952; Serial 331,839, filed January 19, 1953, and abandoned in favor of Serial No. 579,184, filed April 19, 1956; Serial 365,801, filed July 3, 1953; and Serial 411,967, filed February 23, 1954, of which this application is a continuation-in-part.

I claim:

1. In a valve construction, a body providing flow passages and a body space between the passages, a valve gate movable in said body space between open and closed position, said gate having parallel side surfaces, a pair of resilient seal rings of the O-ring type disposed on opposite sides of the gate to generally embrace said passages, each seal ring normally having one side of the same in sealing contact with the adjacent side face of the gate, and mounting means for each of said seal rings, each of said mounting means being sealed with respect to the body and forming an annular recess for loosely accommodating a seal ring, each recess being defined by inner and outer surfaces adjacent the inner and outer peripheries of the associated O-ring, together with a bottom surface spaced from the adjacent side face of the gate and engaging the other side of the O-ring to thereby squeeze the O-ring between the same and the gate, the intersections of the inner and outer defining surfaces and said bottom defining surface forming inner and outer recess corners, and means incorporated in each of said mounting means for establishing pressure equalizing communication between the inner recess corner and the corresponding passage in the valve body and between the outer recess corner and the space within the valve body.

2. A valve as in claim 1 in which each of the inner defining surfaces is formed by the outer periphery of a separate seat ring, said seat ring being fitted within the corresponding mounting means whereby the tolerance of said fit provides pressure equalizing communication between the corresponding inner recess corner and the corresponding passage.

3. A valve as in claim 2 in which that portion of each mounting means that surrounds the O-ring forms a flat annular metal surface disposed in close proximity with the adjacent side of the valve gate and in which the corresponding seating ring provides a flat annular metal surface in contact with the adjacent side face of the gate, said seating ring being dimensioned whereby said last named surface of the same is in a plane slightly offset with respect to the annular metal surface surrounding the O-ring.

4. In a valve construction, a body providing flow passages and a body space between said passages, a valve gate movable in said space between open and closed positions, said gate having parallel side surfaces, a pair of resilient seal rings of the O-ring type disposed on opposite sides of the gate to generally embrace said passages, each seal ring normally having one side of the same in sealing contact with the adjacent side face of the gate, and mounting means for said seal rings forming annular recesses for loosely accomodating the same, each of said mounting means comprising an annular metal portion sealed with respect to the body and having a flat annular surface surrounding said recess and in close proximity with the adjacent side face of the gate, said recess being defined by inner and outer surfaces adjacent the inner and outer peripheries of the associated O-ring and a bottom surface that is spaced from the adjacent side face of the gate and which engages the other side of the O-ring to thereby squeeze the O-ring between the same and the gate, an inner seat ring fitted within the annular portion and having its outer periphery forming said inner defining surface of said recess, one end face of said seat ring being disposed in contact with the adjacent side face of the gate over an annular area surrounded by the O-ring, and a pair of radially spaced lips formed respectively on said annular metal portion and on said end of said inner seat ring, said lips being adjacent the corresponding side face of the gate and serving to retain said O-ring against dislodgment from the recess, said inner seat ring being removable from said annular metal portion by movement of the same in a general direction toward the location of the gate, removal of an inner seat ring enabling removal of an associated resilient O-ring.

5. In a valve construction, a body providing flow passages and a body space between the passages, a valve gate moveable in said body space between open and closed positions and having parallel side faces, a pair of resilient seal rings of the O-ring type disposed on opposite sides of the gate to generally embrace said passages, each seal ring normally having one side of the same in sealing contact with the adjacent side face of the gate, and mounting means for each of said seal rings, each of said mounting means being sealed with respect to the body and forming an annular recess for loosely accommodating a seal ring, each recess being defined by inner and outer surfaces adjacent the inner and outer peripheries of the associated O-ring, together with a bottom surface spaced from the adjacent side face of the gate and engaging the other side of the O-ring to thereby squeeze the O-ring between the same and the gate, the intersections of the inner and outer defining surfaces and said bottom defining surface forming inner and outer recess corners, and means incorporated in each of said mounting means for establishing pressure equalizing communication between the outer recess corner and the space within the valve body.

6. In a valve construction, a body providing flow passages and a space between said passages, a valve member movable in said space between open and closed positions, a pair of resilient seal rings of the O-ring type disposed at opposite sides of said valve member to generally embrace said passages, each O-ring normally having one side face thereof in sealing contact with the adjacent side face of the valve member, and mounting means for each of said O-rings, each mounting means providing a recess for loosely accommodating its associated O-ring, and means for establishing pressure equalizing communication between the bottom corners of said recess, and the body space and corresponding passage, said last named means causing each O-ring to be urged into its accommodating recess responsive to application of pressure differential to either the outer or inner periphery of the same.

References Cited in the file of this patent

UNITED STATES PATENTS

| | | |
|---|---|---|
| 2,030,458 | McKellar | Feb. 11, 1936 |
| 2,529,412 | Parker | Nov. 7, 1950 |
| 2,533,931 | Hartley | Dec. 12, 1950 |
| 2,558,260 | Maky | June 26, 1951 |
| 2,623,724 | Downey | Dec. 30, 1952 |
| 2,674,436 | Jones | Apr. 6, 1954 |
| 2,718,372 | Broz | Sept. 20, 1955 |
| 2,747,611 | Hewitt | May 29, 1956 |

FOREIGN PATENTS

| | | |
|---|---|---|
| 503,511 | Belgium | of 1951 |
| 863,183 | Germany | Jan. 15, 1953 |